United States Patent [19]
Widess

[11] 3,794,827
[45] Feb. 26, 1974

[54] INVEL SYSTEM OF VELOCITY DETERMINATION

[75] Inventor: Moses B. Widess, Houston, Tex.

[73] Assignee: Amoco Production Company, Tulsa, Okla.

[22] Filed: Jan. 8, 1973

[21] Appl. No.: 322,056

[52] U.S. Cl............... 340/15.5 TC, 340/15.5 TD, 340/15.5 CP
[51] Int. Cl.............................................. G01v 1/36
[58] Field of Search 340/15.5 TC, 15.5 TD, 15.5 CP, 340/15.5 MC

[56] References Cited
UNITED STATES PATENTS
| | | | |
|---|---|---|---|
| 3,648,227 | 3/1972 | Sengbush | 340/15.5 TD |
| 3,697,939 | 12/1970 | Musgrave | 340/15.5 TD |
| 3,731,269 | 4/1971 | Judson et al. | 340/15.5 TC |

Primary Examiner—Maynard R. Wilbur
Assistant Examiner—H. A. Birmiel
Attorney, Agent, or Firm—Paul F. Hawley

[57] ABSTRACT

This is a new way of compositing multifold common-depth-point data from seismic prospecting operations to improve the making of static corrections, particularly when determining velocity. Such static corrections eliminate time differences in arrival of reflected seismic events on the various traces of a seismic spread due to differences in thickness of the low velocity or "weathered" layer below the geophones, to differences in surface elevation, and the like. Seismic waves are generated successively at generating points, each near the earth's surface. Seismic waves are received and reproducibly recorded at geophones at least one of which in each case is close to the generating point and another is near the location of another generating point. These spatial relationships are symmetrical. Reproduced reflected waves from each generating point received at the respective near geophone locations are composited at approximately equal peak amplitudes. This procedure is then repeated for new generating and receiving points which maintain approximately constant the mean location of reflection points on the seismic reflecting beds. Visual traces equivalent to the composited "short" traces are reproduced after elimination of the normal moveout correction. The reflections from a common reflecting bed are aligned by introducing a static correction into each composited trace to produce substantial time alignment at a mean reflection time. The identical seismic static correction is then applied to any further record processing of the seismic data from the "far" geophones, similarly composited, before producing visual traces of such data. The procedure is valuable both for making velocity panels for determination of velocity vs. depth in seismic prospects, and in determining depth and/or dip of reflecting subsurface discontinuities.

5 Claims, 7 Drawing Figures

INVEL SYSTEM OF VELOCITY DETERMINATION

BACKGROUND OF THE INVENTION

1. Field of the Invention

Seismic geophysical prospecting by the reflection method has been practiced in the United States since the late 1920's. There has been a tremendous improvement in the methods of handling seismic reflection data and of making the necessary corrections to indicate more accurately the subsurface variations in depth and dip in each prospect. Two types of corrections are ordinarily employed in reducing the original data to useful form. One of these is the so-called static correction; the other, the dynamic correction.

It is well known in this art that static corrections consist of changes in travel time of the reflected seismic waves introduced on the received traces in processing to compensate throughout the record for the effects of such variables as changes in thickness of the low-speed layer or weathered layer as it is cometimes called, the effect of changes in surface elevation of the receivers and the like. When such a correction is made on a theoretically perfect basis, there is no time difference between the seismic traces resulting from received waves at geophones located at various stations for the same reflected event appearing on any trace due to changes in thickness of the weathered layer or due to the fact that one geophone is higher than another. This is discussed in detail in every modern work on seismic geophysical prospecting and in many research papers which have been published in such magazines as Geophysics.

Similarly, the dynamic corrections are differences of time introduced systematically into the traces in amounts which compensate for the fact that for any reflection, the received waves arrived at geophones at different surface locations at different times due to the differences in distance from the seismic wave generation point. Such corrections are called "normal moveout." They are a function of the distance from source to receiver (the so-called x-distance) and also the average speed of seismic waves to the reflecting bed and hence changes from geophone to geophone for any one source location. For any geophone, the dynamic correction is greater for shallow reflection events and lesser for more deep-seated reflections with greater travel times. The general effect of the introduction of dynamic correction into the data obtained from any particular source location is to eliminate theoretically the effect of the x-distance so that the traces from geophones at different x-distances are corrected ideally as if they were all due to a source and geophone having the same location.

In order to make accurate normal movement corrections, it is necessary to have precise determination of the average seismic velocity of compressional waves as a function of the varying depth to reflecting beds. Since these velocities are found in practice to change from one geographical location to another, the dynamic correction applied for one location may be improper when applied at another, and result in a fictitious misdetermination of either depth to reflecting horizon or the dip of this horizon. As a result, various methods have been evolved for determining velocity in terms of depth from the normal moveout of seismic traces, which are functions of x-distance (determinable) and variation of velocity with depth. Two classes of methods for determining this velocity have resulted, particularly when the general system of obtaining the data is the common depth point system which was first shown in the Mayne U.S. Pat. No. 2,732,906. The class most commonly used consists of the common depth point (CDP) velocity methods, in which the normal moveout is determined from the traces of a CDP-gather. It is known to those skilled in this art that such methods have the merit of eliminating the error resulting from curvature of reflecting strata, but they are subject to error from inaccurate statics. An example of such a method is the Ferree et al. U.S. Pat. No. 3,681,749.

The other class of ways to determine velocity from normal moveout consists of the interlocking-profile methods. In these methods statics are eliminated, but error is incurred from bed curvature. Since in most land prospects the static error is more severe than relfecting bed curvature, the interlocking-profile methods have considerable appeal.

Both of these classes of methods are readily applicable when reflection moveouts are picked out either manually or by a computer. Furthermore, CDP velocity methods are known which do not require picking reflections, in one sense of the term. In such methods the so-called velocity panel method is of definite importance. Here the seismic data obtained for a plurality of x-distances but with common depth point, are displayed repeatedly and for each display a different average velocity is employed so that the dynamic corrections made change progressively from display to display. On such a velocity panel, if ideal static corrections have been made, the set of traces with normal moveouts corresponding to a particular velocity function with depth should show constant arrival time at a depth for which the assumed average seismic velocity to that depth corresponds almost exactly to the actual average seismic velocity to this depth. This is further discussed in connection with my invention in the following description of the preferred embodiment. It is sufficient to state here that the general principles of this method have been known and used in a variety of visual picking or computer determined responses for sufficient time to show users that this is a very valuable method, theoretically, of determining seismic velocity in terms of depth. However, there has been one lack in such a system. It has been not easy to provide a good static time correction system. I have found that it is possible to eliminate the effect of statics by what I call the INVEL method (that is, interlock velocity) which in principle permits both precision in eliminating static time differences between traces and also permits use of static corrections which produces time alignment of the traces at a desired mean reflection time. It is found that this type of static correction is applicable of course not only to velocity panel determinations but also to ordinary seismic determinations of depth and dip of reflecting horizons.

DESCRIPTION OF THE PRIOR ART

Background on static and dynamic corrections in seismic prospecting is found, as already mentioned, in any work on seismic prospecting. For example, the text *Geophysical Prospecting*, by Milton Dobrin, McGraw-Hill Book Company, Inc., New York, Second Edition, 1960, covers normal moveout correction on pages 120–123 and static corrections on pages 123–129, and gives a useful bibliography on page 147. One method of making dynamic and static corrections by an analog computer is discussed in the Evans U.S. Pat. No. 2,884,194 and another using a hybrid computer is the Hadley et al. U.S. Pat. No. 3,323,104.

While at first glance it would appear that the Ferree patent mentioned above is pertinent to the system of my invention, on further consideration it will be noted that the actual correction system there proposed is quite different. It does not make use of traces from spaced pairs of sources and detectors and does not employ the static correction based on short x-distances in making the static corrections for traces of long x-distances.

SUMMARY OF THE INVENTION

Seismic data is obtained in which the reflections involve pluralities of sets of seismic sources and receivers. In each set, typically, there are four traces of predominant importance. For each source the geophone spread includes two geophone group locations, one near and one far from the source, which same geophone group locations are used for a source located essentially at the symmetrically opposite point. Thus, the configuration is used in which each of the pair of sources produces data received by the same pair of receivers. The two short traces have the same x-distance and are composited to produce a single composited trace. The key to this method is that the composite of the corresponding long traces, which also have a respectively same x-distance, has essentially the same static delay as the composite of the two short traces. Thus a static correction applicable for the composited short traces is applied to the composited long traces.

The common depth point method is employed. Thus after each set of two sources is employed, another set of two sources is employed with corresponding changes in the near and far geophone group locations so that for the far geophone group location essentially the same two reflecting points as before are involved on any bed. If a conventional CDP prospecting system is employed, the normal moveout correction is then applied (if necessary; ordinarily it will not be) to a plurality of the composited short traces and these traces are represented visually, usually with some scatter, about a mean reflection time. The relative time delays, i.e., static corrections, are then changed so that the short traces are time aligned on the mean reflection time. The remainder of the seismic data is then corrected (that is, the long traces are corrected), just in accordance with the static corrections introduced on the short traces, before producing the record sections.

In the preparation of velocity panels, exactly the same type of static correction discussed above is applied to the composited long traces for each pair of usually closely spaced common depth points. The resultant velocity panels tend to show a very straight line for all of the traces at each reflection horizon for the velocity which corresponds to the actual velocity for the travel time.

As is common with other methods of using CDP data, it is possible here to use quasi-CDP data in the sense of using data where the pair of reflection points on a bed are not precisely that of other pairs of traces but varies from them by not more than a half geophone location.

BRIEF DESCRIPTION OF THE DRAIWNGS

DESCRIPTION OF THE PREFERRED EMBODIMENT

Figure 1:
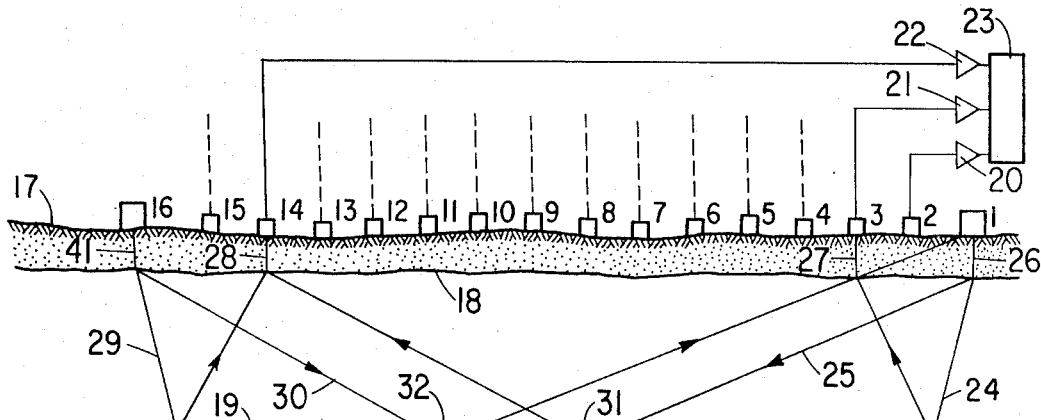
FIG. 1 shows in diagrammatic simplified form a cross section of the earth, including a weathered zone of varying thickness and a surface on which geophones may be at different vertical elevations, showing three arrangements of sources and some of the corresponding geophone group locations for obtaining CDP data of the type used in this invention.
Figure 1:
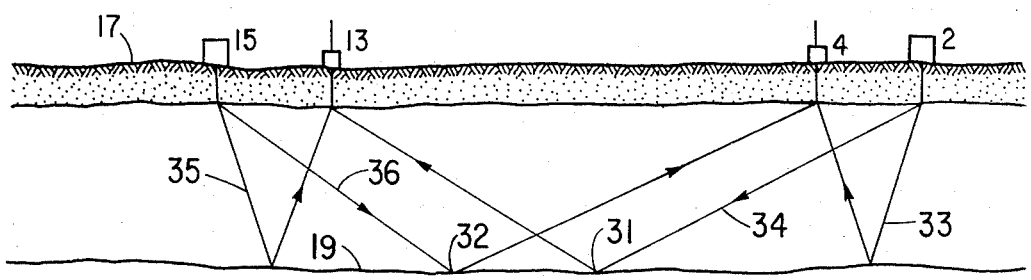
Figure 1:
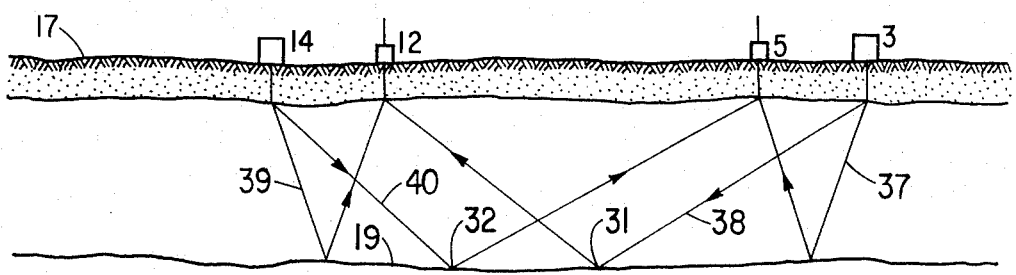

In FIG. 1 there is shown in schematic form a cross section of the earth below the surface 17. Immediately below the surface is a low velocity layer, often called the weathered layer, in which the velocity of seismic compressional waves is of the order of 2,000 ft/second. This is bounded usually rather abruptly by a boundary 18, below which the seismic velocity is usually of the order of three to four times that in the weathered layer. This velocity is a function of the elastic constants and density of the various strata which make it up. Due to compaction and similar effects, the velocity below the weathered layer ordinarily increases with depth. The effect of changing (increasing) seismic velocity with depth produces generally curved rather than straight-line ray paths, which are characteristic of constant velocity propagation. For simplicity this is not shown in this figure. A reflecting bed is shown at 19, where the elastic constants of the subsurface strata change abruptly, and for simplicity of description we shall assume the bed is flat. Numbers 1 to 16 represent locations at substantially equal intervals (of the order of 200 to 500 feet) at which either a seismic source or a group of geophones is centered. A surface source is indicated by a rectangle at station 1. Such a source could be, for example, a Vibroseis vibratory source, or a weight-drop arrangement as has been described by McCollum or the like. A plurality of geophone groups has been shown diagrammatically by the smaller rectangles 2 through 15, and a second source has been shown at location 16 by the second large rectangle. The various geophone groups are connected in a spread to multi-channel amplifiers, such as amplifiers 20, 21, and 22, and hence to the multiple-trace recorder 23, which preferably is a multitrace magnetic tape recorder, as is well known in this art.

In use, the source 1 is first employed to generate seismic waves which travel various paths. Some of these are reflected waves. They are picked up at geophones at the various points along the spread. Particularly of importance in this discussion are the geophone groups centered at locations 3 and 14, which correspond to the seismic ray paths 24 and 25, respectively. It is noted that these paths include a section 26 through the low-speed bed at the location of the first seismic source, as well as corresponding paths 27 and 28 through the weathered layer at geophone group locations 3 and 14, respectively. Put another way, the travel time from source 1 to geophone 3 includes the time $T_{26}$, $T_{27}$, corresponding to the path lengths 26 and 27, through the weathered layer at locations 1 and 3, respectively. Similarly, the travel time on path 25 to the geophone at location 14 involves the times $T_{26}$ and $T_{28}$ corresponding to paths 26 and 28, respectively. The geophone at location 3 can be considered "near," i.e., it has a small x-distance; whereas, geophone 14 is a "far" geophone, i.e., involving a longer x-distance from the source.

The geophones being connected through amplifiers to tape recorder 23 produce separate reproducible records of the seismic waves reflected from the subsurface bed 19 at the various geophone locations shown. For simplicity the leads and amplifiers corresponding to the geophone groups at stations 4–13, respectively, have been omitted, but it is to be understood that the output of these geophones are similarly reproducibly recorded as separate traces on the magnetic record employed on recorder 23. Additionally, as is well known in this art, there is recorded on this record a time trace which permits the relative time between any two events on the reproducible traces to be determined accurately to the order of a millisecond.

It is convenient to show on this same cross section the seismic wave path which results when a seismic source is ultimately set up at location 16. The reflected paths to the geophones at stations 14 and 3, respectively (paths 29 and 30) are shown. NOte that the source at station 16 occupies essentially the same position relative to the geophone group at 14 as that at station 1 did at the geophone group at station 3 in the first record. This is the symmetrical relationship earlier mentioned. The seismic waves reflected from subsurface bed 19 along wave paths 29 and 30 are received at the geophone stations (including 14 and 3) respectively, and are reproducibly recorded through the multi-channel amplifiers 20–22 on the multiple trace recorder 23, as in the step discussed above. The wave paths 25 and 30 have reflection points 31 and 32, respectively, which are usually not far apart.

If the surface generating source at station 1 and later at station 16 is of the impulsive variety, there is no need to correlate the records produced on recorder 23. However, if these sources produce vibratory waves of the Vibroseis type or equivalent, the pilot signal should be recorded also and the first step in record processing will involve reproducing the received waves and correlating them as individual traces with the pilot signal to produce in turn reproducible records of the sort which would have been originally recorded if an impulsive source would have been employed.

After the record has been made with the source at position 1, it is next moved to location 2 (as shown in FIG. 1((b))), while the geophone spread between locations 4 and 13 is maintained. Then the wave paths of interest will be 33 (from the source at location 2 to the geophone at position 4), and 34 (from the source at position 2 to the geophone at station 13). Subsequently, the source is moved to location 15 and employed there, sending out waves, including those on paths 35 and 36, respectively, received at the geophone spread, including locations 13 and 4. For simplicity, the spread of geophones between positions 4 and 13 has been omitted, but it is to be understood that these are employed with the amplifiers and recorder, as before. As before, the reproducible records which must be obtained are those corresponding to an impulsive source obtained directly or by correlation.

The third set of positions for the sources used is shown in FIG. 1(c), respectively at positions 3 and 14, maintaining the spread of geophones between locations 5 and 12, as shown. In this case the wave paths of particular interest are 37 and 38 for the source at position 3, and 39 and 40 for the source at position 14. It is to be noted in FIGS. 1(b) and (c) that reflection points 31 and 32 are common on the reflecting bed 19 for all positions of the source, while the reflection points between source and the "near" geophone group are moving progressively along the bed. The x-distance between source and near geophone group is essentially the same in each position shown.

Still further similar movements of the source relative to the geophone spread will ordinarily be employed. Thus, there will be for each such arrangement two reproducible records corresponding to the two positions of the source with respect to the end groups of geophones as the spread is successively decreased in length, as far as is desired. Ordinarily I prefer to use sufficient geophone stations with intervals of about 200 to not more than about 500 feet between them, so that at least five (and preferably at least eight) sets of records of waves traveling the paths of the type shown in FIG. 1(a), (b), and (c) are available.

It is to be noted in FIG. 1 that the path 41, which is part of path 29 has been shown as the same as a part of path 30. While this is not exactly so, the difference between these two path lengths and orientations is not great and is sufficiently small so that it can be neglected in the type calculations which follow. This is also true of the paths 28 (part of paths 29 and 25), paths 27 (part of paths 30 and 24), and paths 26 (part of paths 24 and 25). The same essential simplification is shown in FIG. 1(b) and FIG. 1(c).

The first point in record processing (other than the obvious step of correlating with a pilot signal if a nonimpulsive vibratory source is used) is to reproduce the seismic waves received at gorup location 3 with the source at station 1 and that at group location 14 due to the source at station 16. This is done on a reproducer, for example any of the ordinary seismic playback units now well known in the art. One such unit is shown diagrammatically in FIG. 2. Here, a revolving drum 50 carries a multiple trace magnetic record 51 attached about the cylindrical surface. A plurality of pickup coil units $52_1$ to $52_{14}$ are mounted slidably in slots in a stationary cylindrical support 53 mounted so that the position of each such pickup unit can be adjusted angularly with respect to the position of all other such units. One side of the leads to each of these pickup units is grounded; the other is connected to a large resistance $54_1$ to $54_{14}$. Preferably these are of equal maximum resistance. Switching terminals on a switch 55 permit connecting identical low impedance add resistors $56_1$ to $56_8$ to the high resistances. Each of these add impedances has a resistance preferably not above one-tenth of that of each of the resistors $54_1$. The switching terminals on switch 55 are used to connect one side of two of the add resistors $54_n$ together to one add impedance $56_n$. This is a well known expedient, used so that the relative amplitude of the signal voltage on each of the add impedances such as $56_1$ is proportional to the sum of the voltage outputs of the two pickup units $52_n$ to which it is connected. By adjusting the size of the add resistors $54_n$, it is possible by trial and inspection to insure that the voltage output of the add impedance $56_n$ on the average consists of at least roughly equal components from each of the two magnetic traces on record 51 to which it is connected through the multiple switch 55. Accordingly, when the drum 50 is rotated about its axis at as near as possible constant angular velocity, the generated voltage on each add impedance $56_n$ is composed at each instant of time of the sum of the instantaneous amplitudes from two magnetic traces which in turn represent the output of two geophone stations. The signal on each add impedance is a composited signal. By this is meant that it is made up of at least approximately equal contributions, on the average, of the instantaneous signal voltages received at the two geophone stations to which the magnetic traces correspond. The voltage across each add resistor $56_n$ is applied through one channel of a multi-channel buffer amplifier $57_n$ to one trace of a multiple trace recorder 58 or multitrace oscillograph, a portion of the record of which 59 is shown. This record is visual, on which traces are presented in side-by-side relationship and may be presented in variable amplitude, variable density, or other means of visual presentation.

Figure 2:
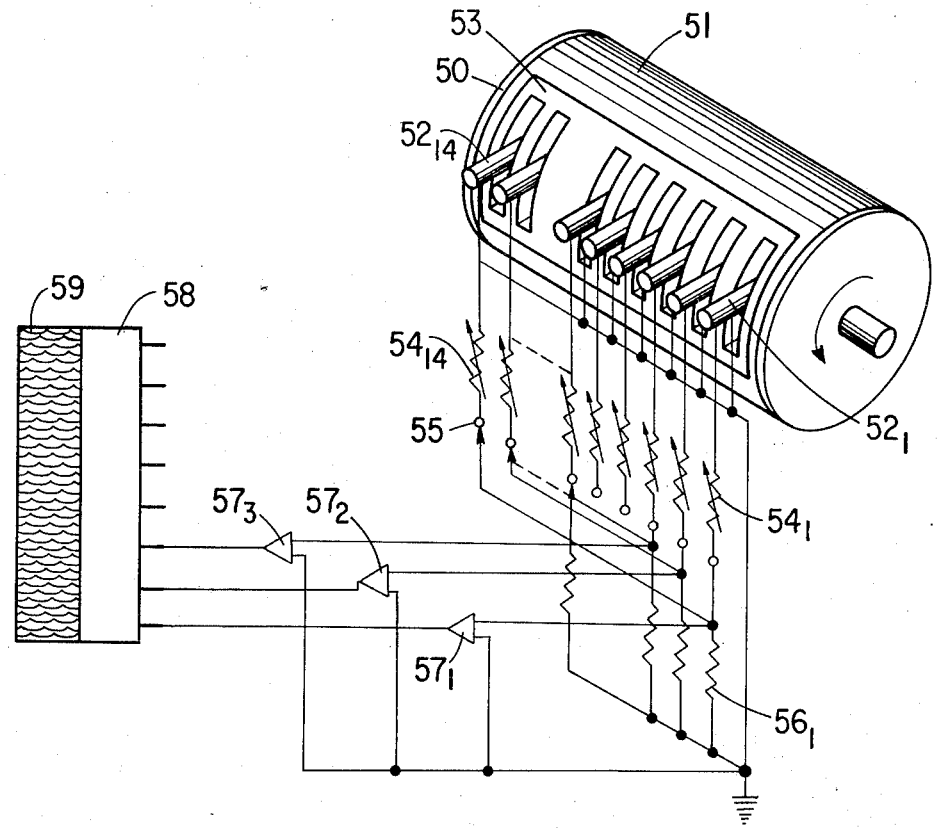
FIG. 2 shows in diagrammatic form some equipment for obtaining composite traces used in this invention.

The operator of the unit shown in FIG. 2 is aware in advance of the locations of the particular traces on the multiple trace magnetic record 51 which he wishes to composite. These will be the traces corresponding to paths 24 and 29, and 25 and 30, of the arrangement shown in FIG. 1(a), and the corresponding traces for the changes shown in FIG. 1(b), (c), and so on. Accordingly, the apparatus shown in FIG. 2 is used to produce composited traces in which the response of the "near" geophone groups have been added instant by instant, for each spacing between the seismic sources. For example, on a record of such compositing trace 1 of record 59 shows the composited result of two traces corresponding to ray paths 24 and 29. Adjacent it, the second trace shows the composited result of the waves on the ray paths 33 and 35; the next shows that for waves along paths 37 and 39, and so on. Preferably another, separate section of the record shows the composited result of the waves received along ray paths 25 and 30 adjacent that composited from the waves received along ray paths 34 and 36, which in turn is adjacent that composited from the waves along ray paths 38 and 40, and so on.

Figure 3:
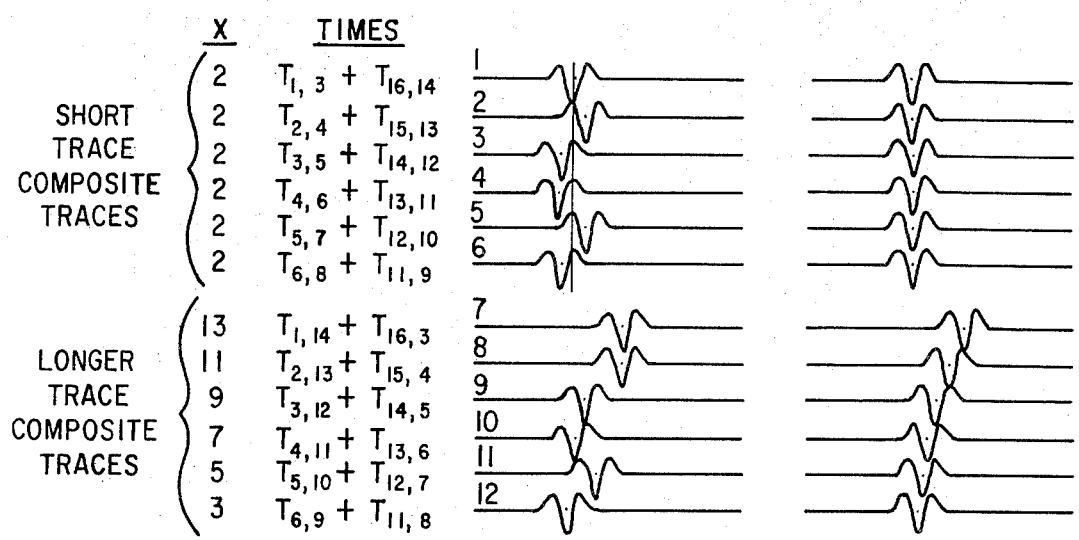
FIG. 3 shows a plurality of traces of composited data for a common reflection as received at "near" and at "far" geophones, respectively, before and after introducing the static time correction which produces alignment.

On FIG. 3 there is shown in the middle of the figure a series of traces labeled 1 to 12. Traces 1 to 6, respectively, are a set of composited traces on which trace 1 shows the composite corresponding to ray paths 24 and 29. Similarly, trace 2 shows the composite corresponding to ray paths 33 and 35, and that on trace 3 shows the composite corresponding to ray paths 37 and 39, and so on. When these traces are shown in side-by-side relations, any reflection from a common subsurface reflecting bed appearing on all the traces will appear in a more or less regular timed sequence, except that there may be irregularities due to static time differences. Using the nomenclature that $T_{1,3}$ represents the travel time of the waves received at geophone group location 3 with the source at location 1, it is seen from reference to FIG. 1 tha trace 1 represents the compositing for waves of times $T_{1,3}$ and $T_{16,14}$. In FIG. 3, the column just before the ray traces specifies these various times. Each of these traces 1 to 6 could be called a short-trace composite trace, since the distance along the spread (the x-distance) is only two units, i.e., from position 1 to position 3, or 16 to 14, and the like. This is a sufficiently short distance so that the normal moveout correction is not significant. Therefore, as stated above, if the static corrections on each of these traces compensated precisely for differences in travel times due to differences of weathering thickness and elevation correction, all of the traces would show for each reflection essential alignment at a mean reflection time, representing the travel time to the bed concerned. Typically, however, one finds (as shown in FIG. 3) that before alignment correction is applied, these composited traces do not show this time alignemtn. The "picks" for the second leg for each of these reflections are shown and it is seen that on some traces to secure time alignment, a lag of a few milliseconds needs to be introduced into the composite trace, and into others a lead. This can be done after the mean time has been determined, which is shown by the vertical line through the first six traces. Thus, for example, trace 1 needs to be advanced slightly, trace 2 advanced about 3 times trace 1, traces 3 and 4 lagged, etc. This is accomplished, knowing the angular speed of rotation of drum 50, simply by moving arcuately the two pickup units (such as $52_1$ and $52_{14}$). A lead is achieved by moving these pickup units or heads opposite to the direction of rotation of the drum; a lag by moving in the same direction as the rotation. Ordinarily after a little skill has been acquired, this can be accomplished with one resetting of each two reproducing heads, after which a second record is produced. A small portion of such a second record is shown on the righthand side of FIG. 3. Here, the portion shown of record 59 shows that static time corrections have been applied on each composited short trace to produce substantial time alignment of all of these six traces.

It is desirable in the use of this method to have as many traces of the sort shown in the top part of FIG. 3 as possible to increase the precision of the static corrections. I prefer to use at least five traces.

If the first record does not produce a completely adequate time alignment, the pickup heads are again moved pairwise until such result is accomplished. The appropriate static corrections have now been introduced into the short-trace composited traces. The next step consists in introducing exactly the same static correction into the longer-trace composite traces. For example, traces 7 through 12 in the middle of FIG. 3 represent the composited effects of the received waves along such as paths 25 and 30 in FIG. 1(a). More specifically, as shown in the column marked "Times" trace 7 represents the composited traces where the source was at station 1 and the receiver group at 14 plus that for the source being at station 16 and the geophone group 3. Similar notations are made in this column for the other composited traces 8 to 12.

A key factor in my method lies in the fact that I have recognized that the same error in static correction originally exists in trace 7 as existed on trace 1, and the same on trace 8 as trace 2, etc. Now, however, a time correction has been introduced into the composite for trace 1. Accordingly, the next step is to introduce precisely the same static correction into trace 7 as was employed in trace 1 to secure the time alignment of the short-trace composite traces. By simply setting arcuately the same time alignment correction for the heads compositing trace 7 as had previously applied to trace 1, this trace now is statically corrected. This same procedure is employed for each of the other traces. Theoretically this is sound because in the compositing, the time delay due to path 26 occurs once in the compositing of the short traces and once in the compositing of the longer traces, and the same is true for the time delays due to paths 27, 28, and 41. Therefore, the same static correction should be employed on these selected short traces and on the corresponding, selected longer traces.

The introduction of this static correction in the longer-trace composites, i.e., that appropriate by actual determination in the top half of the record, will be found to produce not trace alignment but traces with the composites so timed that they are aligned by the appropriate normal moveout correction. This is shown in the lower righthand part of FIG. 3, i.e., the second set of traces 7 through 12. (Here, again, I prefer to employ at least five traces.)

After the appropriate static correction has been introduced into the longer-trace composite traces, the procedural steps vary, dependent upon the type of second visual image which is to be derived from these corrected traces. In each case, this will be in the form of side-by-side seismic traces in a visual presentation, but as discussed above, these composited traces may be employed to produce either an interim section, a seismic section, or a velocity panel.

Figure 4:
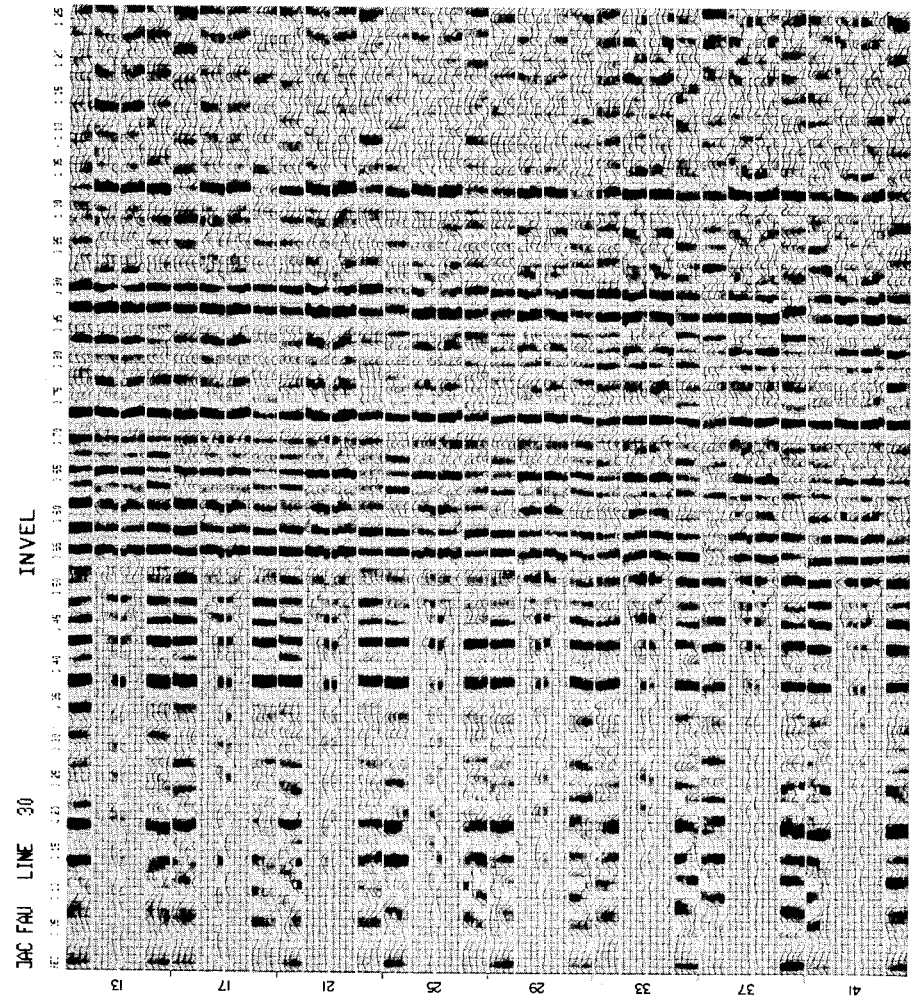
FIG. 4 shows a portion of an INVEL section covering eight sets of INVEL traces, as obtained for a specific field location.

If the interim section is to be portrayed, the appropriate dynamic correction is introduced, i.e., the normal moveout correction is applied to each composited long trace in a manner already known in this art and which does not of itself form a part of the novel features of my invention. FIG. 4 shows a portion of an interim section using my interlock velocity, or INVEL method. This section was actually obtained in the field. It covers eight sets of traces. The Location number at the center of the subsurface coverage for the respective sets of traces is indicated opposite the set. In this example, these centers (locations of points such as the means of locations 31 and 32 on FIG. 1((a)) ) were spaced at increments of distance equal to four geophone group intervals. In each set on this section, for experimental investigation only, the first four traces are the short-trace composite traces for which the sources were outside the respective geophone groups as shown in FIG. 1. The next four traces are the longer-trace composite traces which have exactly the same static correction pattern as the first four traces, and, in addition, a normal moveout correction. The next four traces down this record are the longer-trace composite traces which are in transposed-ray relation to the previous four traces. The last four traces are the short-trace composite traces that are in transposed-ray relation to the first four traces. If the initiation static corrections are equal to those at the short-trace geophone locations, as is common when using surface sources such as the Vibroseis operations, all four quadruplet traces will have the same static patterns. This appears to be essentially consistent in the various seismic sections shown in this figure.

Figure 5:
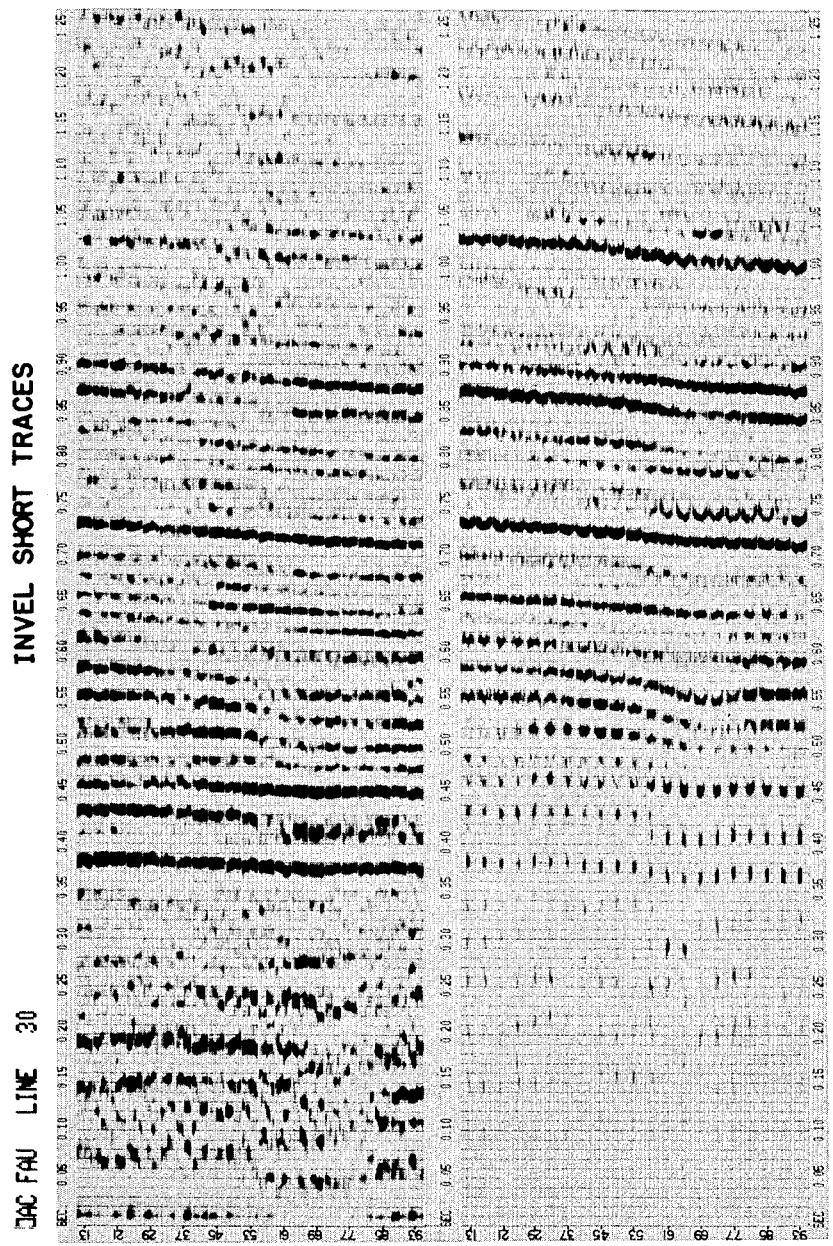
FIG. 5 shows one type of INVEL display in which the sets of short trace composited traces have been plotted separately from the sets of longer trace composite traces, in velocity determinations.

A different type of INVEL display is shown in FIG. 5. This is a type of seismic section display which is a very convenient tool for evaluating velocity and hence can be used for a velocity panel. In this figure the sets of eight short-trace composite traces are plotted separately from the sets of eight longer-trace composite traces.

The lower bank, displaying the longer-trace composite traces, is called an INVEL repeated incidence section (hereafter, repeated incidence is shortened to RI). It is a RI section because every trace of each set has the same subsurface coverage. Even though this subsurface coverage involves the sum of a number of depth points, I find that considerable structural information still remains on the section. These structural features are useful in monitoring the data used in velocity determination, as will hereafter appear. (Structural information may, of course, be obtained from a conventional section, but it is convenient to have that information directly on the INVEL section where it can be seen during the velocity determination period.)

The INVEL RI section in the figure shows a reference at a time of about 0.58 seconds. Because of a severe dip on the flanks of the reef, the short-trace composite traces over the reef involve very severe destructive interference and are useless. However, other reflections are free of such destructive interference. These may be used to determine the static corrections.

For illustrative purposes, the strong reflection at about 0.73 seconds is used to determine the static correction. Note that at locations 29 and 33 the sets of short-trace composite traces are curved. (Colloquially it is stated these traces exhibit "arrowheads.") Since these two arrowheads are also found on other deeper reflections, clearly a static correction is required. Now referring to the RI section, it is seen that positive residual normal For illustrative purposes, the strong reflection at about 0.73 second is used to determine the static correction. Note that at locations 29 and 33 the sets of short-trace composite traces are curved. (Colloquially it is stated these traces exhibit "arrowheads." Since these two arrowheads are also found on other deeper reflections, clearly a static correction is required. Now referring to the RI section, it is seen that positive residual normal moveout occurs on this reflection for all the sets shown between 13 and 53, except for sets 29 and 33. There is thus an automatic check that the static correction is required to account for this discrepancy.

Figure 6:
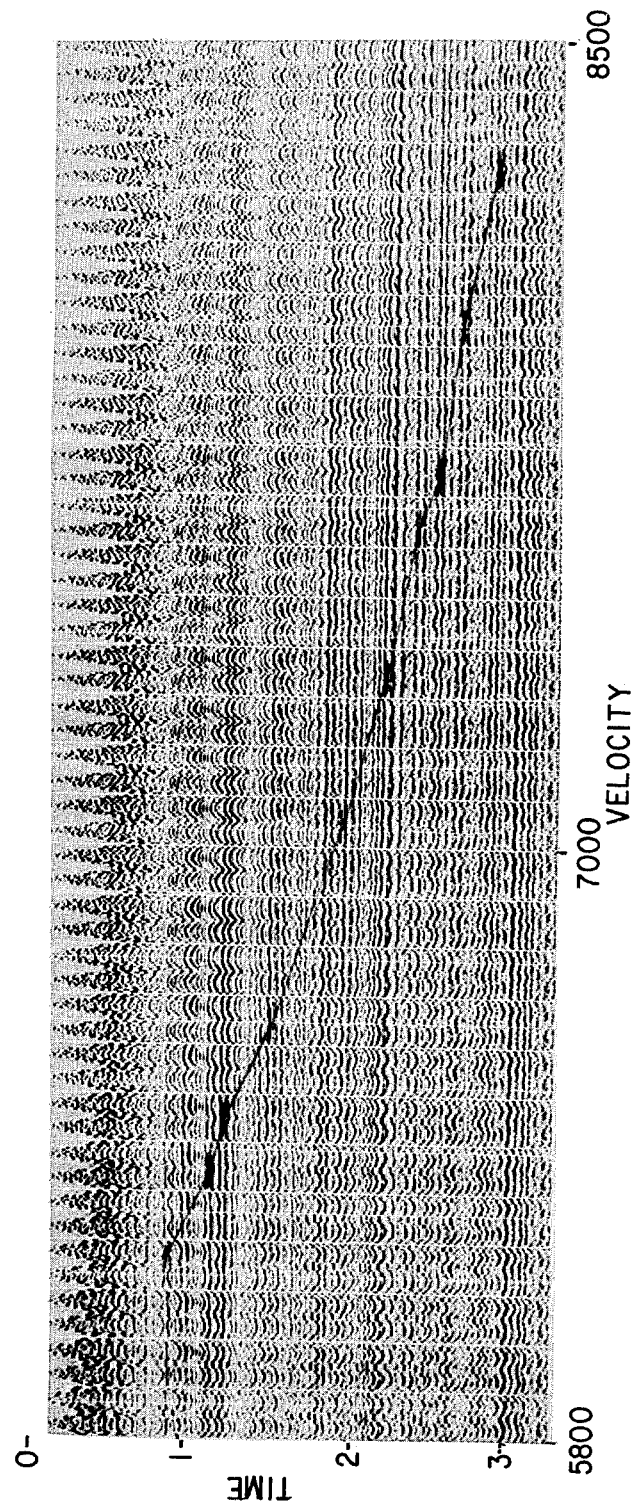
FIG. 6 shows a typical velocity panel from which determinations of seismic velocity as a function of depth may be obtained.

FIG. 6 shows a different, more typical velocity panel, which again is a type of presentation which is well known for obtaining seismic velocity as a function of depth by determining in a systematic fashion what normal moveout is required to produce reflections on the various adjacent traces which show essentially linear alignment. In order that such arrangement be effective, it is of course necessary that adequate static time corrections be made. My INVEL arrangement works very well with such a section, in the sense that it permits the proper static corrections to be applied to the composited traces before the systematically varying normal moveout corrections are applied from which the appropriate velocities are determined, in terms of the total reflection times.

The velocity panel shown in FIG. 6 is prepared using only one field record. This would correspond to one location on the section shown, for example, on FIG. 4, However, in this case the processing involves applying the normal moveout which would be appropriate for one particular subsurface velocity through the length of each record presented. Accordingly, on FIG. 6 the first column shows a record prepared, with a normal moveout correction appropriate to a constant velocity of 5,800 ft/sec. The same record is then employed in the next column, except that now the seismic velocity is 5,900 ft/sec, and so on. While there are many ways in which geophysicists can employ such a panel to determine velocity as a function of depth, one simple treatment will suggest the utility.

If precisely the right static corrections have been applied, and if the normal moveout correction for any particular reflection is for exactly the appropriate velocity for that particular travel time, the entire group of traces presented in any one particular column should be in time alignment, thus presenting a straight line. If the appropriate normal moveout has not been employed, there is systematic curvature from trace to trace, due to the variation in x-distance. The traces, therefore, will show a "bow" or "arrowhead" which will be convex for a wrong seismic velocity and concave for the opposite kind. In this particular figure, for example, at the left, the seismic velocity is too low and the "bows" all show a low spot at the center. On the extreme right, at least in the upper part of the panel, the velocity chosen was too great and the opposite curvature of bow is seen. Accordingly, the trained observer can work his way by eye across the record picking out at any particular reflection time the particular column in which the nearest approach to complete time alignment is achieved, or the center of such time alignment traces if several columns show about the same correction. This permits the variation of velocity with travel time to be ascertained. A line has been plotted superimposed on this velocity panel showing the velocities at particular travel times, at which there are no arrowheads or bows, showing average velocities ranging from 6,100 ft/sec at slightly under one second travel time to 8,200 ft/sec at a travel time of about 2.8 seconds.

Now it is apparent that if the proper and precise static corrections have not been applied, under no conditions should the traces in any one column in this record show a complete lineup. Accordingly, the INVEL system already discussed is particularly appropriate to correct these traces shown, especially since precise corrections may be applied even through the x-distance employed for the velocity panel is quite great.

It is to be noted that in using the INVEL method, static corrections are determined from the short-trace INVEL sections in the form of lead or lag times which, trace by trace, are to be added or subtracted as appropriate to the long traces involved on the INVEL RI section.

While this discussion has been limited to an analog arrangement for applying the static correction determined from the short composited traces to the appropriate longer-trace composite traces as already described in connection with FIGS. 1, 2, and 3, it should also be stated that in the modern system of using digital recording techniques, and applying timing corrections, both static and dynamic, by computer, precisely the same steps are appropriate in the INVEL system used with this method of recording and record computer processing as in that described above.

FIG. 1 refers to split spreads. But the INVEL method may also be used with single-end spreads if for every surface point the initiation static correction is (approximately) equal to the reception static correction, as in the case of surface sources. The spread configuration is basically shown in FIG. 7. Here the numbers corresponding to the various elements shown in FIG. 1(a) are again used. The main single-ended shots are made with the surface source used first in position 1 and next in position 70 (i.e., at the location of geophone group 3) while maintaining a spread of geophone groups from 3 to 16, as shown in this figure. Later a shot is made with the surface source moved to position 71 (i.e., position of geophone group 14), recording at location 16.

Using such configurations, the operator of this method composits the impulsive source type of record along the ray paths 24 and 29 and uses composited trace to produce a first visual image of such composited trace with those obtained at other spread distances or x-distances while maintaining the same reflection points (in this case 31 and 32) on the reflecting bed of interest. One then introduces the statis correction to align these composited short traces, as was described in connection with FIG. 3. Finally, one uses such static corrections in the composited long trace or long x-distance records along wave paths 25 to 30 shown in FIG. 7. In other words, the technique used is essentially that previously disclosed when using split spreads, i.e., the configuration of FIG. 1, except the difference in the placement of the seismic source at location 70 and 71 and the addition of traces, such as those at geophone group locations 15 and 16.

Figure 7:
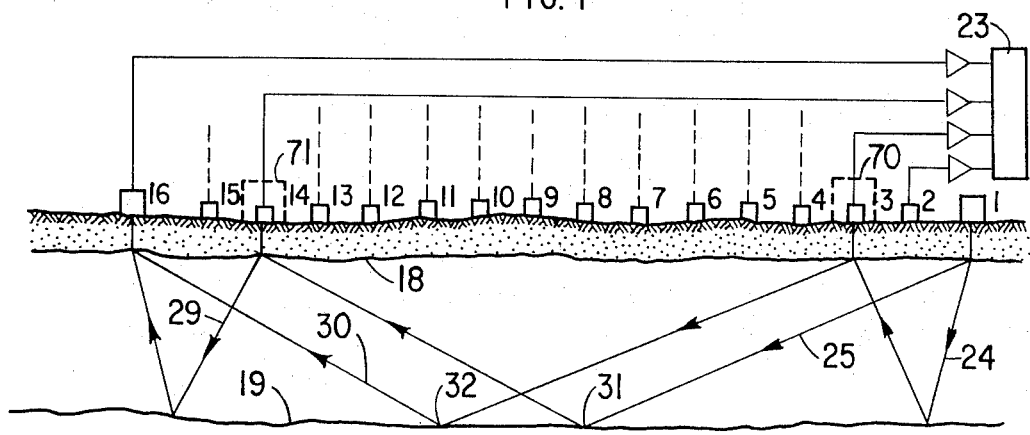
FIG. 7 shows in diagrammatic, simplified form the same cross section shown in FIG. 1 with arrangements of sources and some corresponding geophone group locations used with what are called single-end seismic spreads.

It should be added, as is probably apparent, that the other configurations producing data for the static corrections for the case of single-end spreads utilize the configuration shown in FIG. 7, but with a decreased set of geophone groups. In other words, FIGS. 1(b) and (c) have a precise analogy in the arrangement shown in FIG. 7.

The following additional comments are appropriate regarding practices in applying the INVEL method of determining velocity. These comments refer to near-trace INVEL sections such as the top bank of traces in FIG. 5. Each trace of this bank of traces is produced by compositing near traces for which the reflecting points in any one composite may be very far apart. If a reflecting horizon has strong uniform dip, destructive interference would tend to destroy the reflection during the compositing process. In that case it would be necessary to correct the reflection for dip, at least approximately, before preparing the near-trace INVEL section. For the same reason it is desirable to apply approximate static corrections before using the INVEL method so that the INVEL method needs to deal with only the residual static corrections.

As was mentioned early in the discourse, the interlock-profile methods of velocity determination are subject to error from bed curvature. The INVEL method is no exception this rule but it is important to understand that the INVEL method can minimize this source of error — for the following reason. Bed curvature affects only the near-trace composite traces (since each long-trace composite trace is a composite of traces all having had the same reflecting points). Therefore, usually relatively shallow reflections would be utilized on the near-trace composite section, the bed curvature usually being negligibly small for shallow reflections. Generally speaking, to determine the static corrections one must avoid reflections which are suggested by the seismic section to have significant curvature. When curvature cannot be avoided, one must rely on averaging velocity determinations derived from a long span of the seismic section.

I claim:

1. A method of seismic prospecting including the steps of
   1. generating seismic waves at a first generating point near the earth's surface;
   2. separately receiving and reproducibly recording said seismic waves reflected from a subsurface bed at least at two receiving points at or near the earth's surface, one near and one far from said first generating point;
   3. separately generating seismic waves at a second generating point near the earth's surface in symmetrical relation to the first generating point and near said receiving point which is far from said first generating point;
   4. separately receiving at least near the said two receiving points and reproducibly recording the seismic waves generated in step 3) and reflected from said subsurface bed;
   5. reproducing and compositing said received recorded seismic waves from said first and said second generating point received in each case at the near receiving point, at approximately equal average amplitude;
   6. repeating steps 1) to 5) inclusive, employing new generating and new receiving stations, while maintaining (a) substantially the same distance from each generating point to the near receiving points used in steps 2) and 3), and (b) substantially the same midpoint between the two new generating points and far receivers as was defined by the first two generating points and corresponding far receivers;
   7. producing a first visual image of each of the said composited received waves as one seismic trace of a plurality of such traces in side-by-side relation;
   8. introducing such a static correction into each such composited trace as produces substantially time alignment of said traces at a mean reflection time on said traces, whereby such correction for each such trace is directly related to the two locations of generation points used in producing such trace;
   9. reproducing and compositing at approximately equal average amplitude said received recorded seismic waves from said first and said second generating point received in each case at the far receiving point, in the steps 1) to 6);
   10. introducing the same static correction into each composited set of waves in step 9) as that already introduced in step 8) for the same location of the two generating points involved in step 8) respectively; and
   11. making a second visual image derived from each composited set of waves from step 10) after introduction of the appropriate static corrections, in the form of side-by-side seismic traces.

2. A method in accordance with claim 1 including repeating steps 1) to 6), 9) and 10) a plurality of at least four times so that at least five seismic traces are present in said first and said second visual images in side-by-side relationship, to permit a more precise determination of said mean reflection time on said traces in step 8).

3. A method in accordance with claim 2 in which between steps 10) and 11) a second, dynamic time correction equal to the normal moveout appropriate to the region of said prospecting is introduced into each of said set of waves.

4. A method in accordance with claim 2 in which between steps 10) and 11) a plurality of second, dynamic time corrections (each equal to the normal moveout for a different variation of subsurface velocity with depth) is introduced into each of said traces and step 11) is repeated for each of said plurality of corrections corresponding to one of said variations of subsurface velocity with depth.

5. A method in accordance with claim 2 in which said mean reflection time is chosen from only reflections of good quality from a reflecting stratum of low curvature.

* * * * *